July 24, 1951

H. J. SIEKMANN ET AL 2,561,712

ADJUSTABLE PULLEY V-BELT TRANSMISSION

Filed Aug. 25, 1949

INVENTORS.
HAROLD J. SIEKMANN AND
GEORGE J. KASSELMANN

BY Willard L. Groen

ATTORNEY.

Patented July 24, 1951

2,561,712

UNITED STATES PATENT OFFICE 2,561,712

ADJUSTABLE PULLEY V-BELT TRANSMISSION

Harold J. Siekmann and George J. Kasselmann, Cincinnati, Ohio, assignors to The R. K. Le Blond Machine Tool Co., Cincinnati, Ohio, a corporation of Delaware Original application September 10, 1948, Serial No. 48,738, now Patent No. 2,523,397, dated September 26, 1950. Divided and this application August 25, 1949, Serial No. 112,274

3 Claims. (Cl. 74—230.17)

This is a divisional application of original application, Serial Number 48,738, filed September 10, 1948, now Patent Number 2,523,397, issued on September 26, 1950.

This invention pertains to improvements in adjustable pulley V-belt transmissions and is particularly directed to an improved construction for the V-belt pulleys to facilitate installation, removal, and adjustment of the driving belts.

Another object of this invention is to provide improved means, in a V-belt transmission, for adjusting the V-belt pulleys for proper operation of the belts for maximum transmission of power where the shafts on which the pulleys are mounted, are located at fixed center distances and cannot otherwise be removed from their supporting housing.

Further features and advantages of this invention will appear from a detailed description of the drawings in which.

Figure 2:
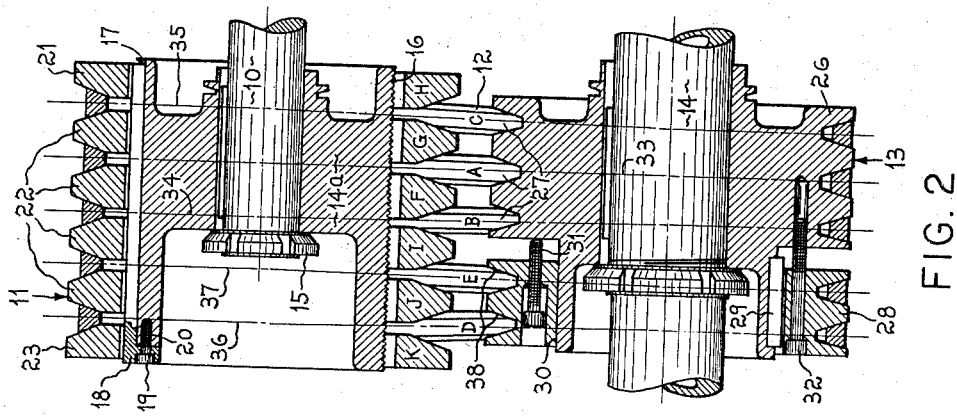
Figure 2 is a sectional view through the belt drive transmission indicated by the line 2—2 in Figure 1.
Figure 1:
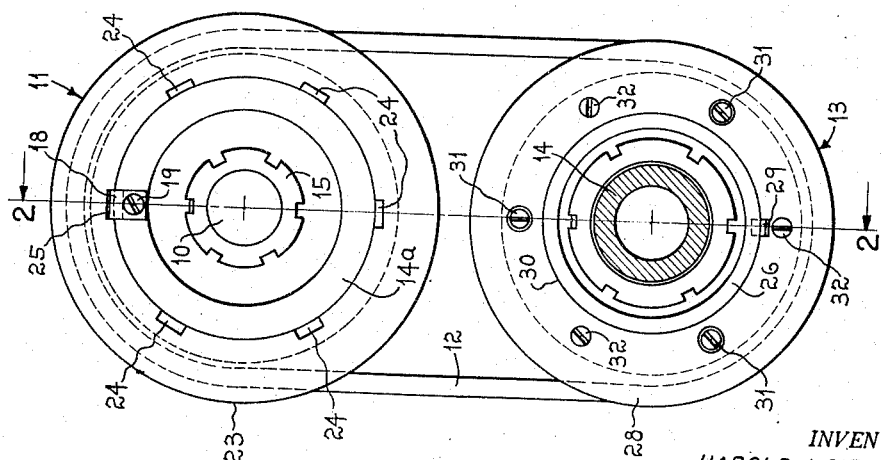
Figure 1 is an end view of an adjustable pulley V-belt transmission incorporating the features of this invention.

For exemplary purposes this invention is shown applied to a close center V-belt transmission having a driving shaft 10 carrying the driving pulley or sheave 11 which drives through the V-belts 12, a driven pulley or sheave 13 fixed on the driven shaft 14. Installation, removal and adjustment of the driving belts 12 between the pulleys 11 and 13 is accomplished by unique arrangement shown best in Figures 1, 2 and 3. On the drive shaft 10 is fixed a pulley hub 14a by a suitable lock nut 15. The outer periphery of the hub 14a has a continuous thread 16 extending along its entire diameter. An axially extending keyway 17 adapted to receive a key 18 which is held in place by a suitable screw 19 threaded into the hub 14a at 20. On the outer threaded periphery of the hub 14a is a series of sheave forming rings 21, 22 and 23, all of which may be rotated and moved along axially in any desired position on the periphery of the hub 14a. Slots are formed at six places in the threaded bores of the members 21, 22 and 23, so that they may be rotated to bring a series of slots in alignment as at 25, Figure 1, and the key 18 inserted therethrough as shown in Figure 2 to lock all of the collars 21, 22 and 23 in desired axial driving position on the hub 14a.

On the driven spindle 14 is fixed a pulley hub 26 of the pulley 13 which has a series of three V-belt grooves 27 formed therein. A second pulley member 28 is axially slidable in driving engagement through a key 29 on the diameter portion 30 of the pulley hub 26. Abutment screws 31 and draw-in screws 32 serve to accurately axially position the pulley member 28 and to lock it into any adjusted axial position.

Figure 3:
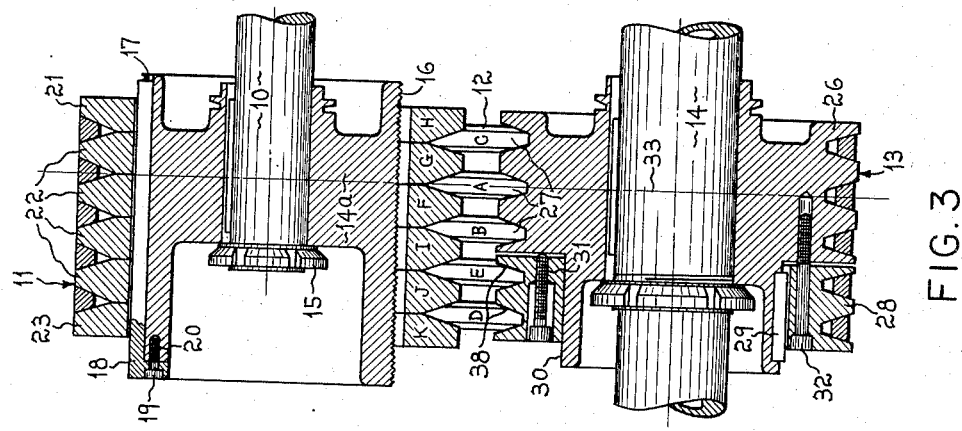
Figure 3 is a view similar to Figure 2 but showing the belts in fully stretched adjusted position.

Thus, by removing the various rings 21, 22 and 23 from the pulley hub 14a the various V-belts 12 may be readily installed on or removed from the shafts 10 and 14 without disturbing their center distances on their journal bearings. When the belts are new and have just been placed on the pulleys as shown best in Figure 2, the two pulley assemblies assume the relationship shown. Belt A is positioned in perfect alignment with both pulleys along the line 33, while belts B and C are slightly divergent with regard to the lines 34 and 35 at the pulley 11. The remaining belts D and E are slightly divergent along the lines 36 and 37 toward the pulley 11. The pulley 28 is moved to maintain this general relationship of the belts D and E with regard to the V-grooves 38 and the grooves formed in the pulley 11. After the belts wear and it is desired to take up tension in them, the two sheave forming collars F and G are moved toward each other as shown in Figure 3, still maintaining the exact alignment of the belt A along the line 33 for both pulleys 11 and 13. The outer collar 21 marked H is moved inwardly to the left as shown in Figure 3 while the collar I is moved toward the right toward the collar F which results in a slightly convergent condition of the belt 12 toward the pulley 11. The sheave forming ring J is moved up against the ring I while the final ring K is moved up toward the ring J as seen in Figure 3. At the same time the pulley member 28 is moved to the right, Figure 3, to maintain a condition of slight convergence of the belts D and E toward the pulley 11. Thus a wide range of selection of belt tensions may be obtained while at the same time avoiding the necessity of disturbing the shaft center distances or dismounting them in any way from the journal bearings and at the same time maintaining substantial correct alignment of the belts in approaching and receding from the V-grooves in the pulleys.

While the apparatus herein disclosed and described constitutes a preferred form of the invention, it is to be understood that the apparatus is capable of mechanical alteration without departing from the spirit of the invention and that such mechanical arrangements and commercial adaptations as fall within the scope of the appendant claims are intended to be included herein.

Having thus fully set forth and described this invention, what is claimed as new and desired to be secured by United States Letters Patent is:

1. In a V-belt drive transmission for a pair of shafts having fixed centers, a means for adjusting, removing or replacing the V-belts comprising a first pulley means including a threaded pulley hub fixed on one of said shafts having a threaded cylindrical diameter portion, a plurality of threaded sheave forming rings mounted on the threaded portion of said threaded pulley hub, a plurality of slots in the threaded portion of said sheave forming rings, and a key carried in a keyway in the threaded periphery of said threaded pulley hub adapted to be inserted in the slots of said sheave forming rings when said rings have been rotated on said threaded periphery to desired axial positions on said threaded pulley hub, and a second pulley means on the other of said shafts operatively related to the V-grooves formed by said sheave forming rings on said threaded pulley hub, including a second pulley fixed on said other of said shafts, a plurality of V-grooves formed in the periphery of said second pulley, a second hub portion formed integral with said second pulley having a peripheral bearing surface coaxial with the axis of rotation of said second pulley, a third pulley mounted for axial movement on the periphery of said second hub portion, key means connecting said third pulley in driving relationship with said second hub portion, and screw adjusting means passing through said third pulley and engaging said second pulley to effect axial adjustment of said third pulley relative to said second pulley and the V-grooves formed by said sheave forming rings on said threaded pulley hub.

2. In a V-belt drive transmission for a pair of shafts having fixed centers, a means for adjusting, removing or replacing the V-belts comprising a first pulley means including a threaded pulley hub fixed on one of said shafts having a threaded cylindrical diameter portion, a plurality of threaded sheave forming rings mounted on the threaded portion of said threaded pulley hub, a plurality of slots in the threaded portion of said sheaves forming rings, and a key carried in a keyway in the threaded periphery of said threaded pulley hub adapted to be inserted in the slots of said sheave forming rings when said rings have been rotated on said threaded periphery to desired axial positions on said threaded pulley hub, and a second pulley means on the other of said shafts operatively related to the V-grooves formed by said sheave forming rings on said threaded pulley hub comprising a second pulley mounted in fixed driving relationship on said other of said shafts, a third pulley mounted coaxially with said second pulley about said other of said shafts, means for connecting said third pulley in positive driving relationship with said second pulley, means for mounting said third pulley for relative axial movement to said second pulley and said sheave forming rings on said threaded pulley hub on said first shaft, and means for adjusting and locking said third pulley in various of its axial positions.

3. In a V-belt drive transmission for a pair of fixed center distance shafts, a pulley hub on one of said shafts, a threaded mounting means on the periphery of said hub for a series of axially adjustable sheave forming rings, a keyway formed in said periphery, a key means in said keyway for locking said sheave forming rings in any desired axial adjustable position on said hub, a second pulley, a series of fixed sheave V-grooves formed in said second pulley, a hub portion on said second pulley, a third pulley axially slidable on said hub portion having other V-grooves formed therein, key driving means between said hub portion and said third pulley, and adjusting means for shifting and locking said third pulley in axial positions on said hub portion so as to maintain substantially accurate alignment of a series of belts passing over said pulleys for any relative axial adjustment of said sheave forming rings of said first mentioned pulley.

HAROLD J. SIEKMANN.
GEORGE J. KASSELMANN.

REFERENCES CITED

The following references are of record in the file of this patent:

UNITED STATES PATENTS

| Number | Name | Date |
|---|---|---|
| 1,740,087 | Hall | Dec. 17, 1929 |
| 1,765,268 | Hathaway | June 17, 1930 |
| 2,140,182 | Bowen | Dec. 13, 1938 |

FOREIGN PATENTS

| Number | Country | Date |
|---|---|---|
| 478 | Great Britain | 1905 |